United States Patent Office 3,313,740
Patented Apr. 11, 1967

3,313,740
EXPOXIDE POLYMERIZATION CATALYSTS, THEIR PREPARATION AND THEIR USE
Richard R. Durst, Cuyahoga Falls, and Wendell O. Phillips, Stow, Ohio, assignors to The General Tire & Rubber Company, Akron, Ohio, a corporation of Ohio
No Drawing. Filed Sept. 26, 1962, Ser. No. 226,443
6 Claims. (Cl. 260—2)

The present invention relates to metal complexes and the use of such complexes as catalysts for the polymerization of epoxy compounds and more specifically to novel aluminum-organic compounds, methods of making such compounds, and methods of polymerizing epoxides employing such compounds as catalysts.

Heretofore it has been difficult to obtain alkylene oxide polymers of high molecular weight as pointed out in U.S. Patent No. 2,870,100. New catalysts have been found as disclosed in U.S. Patents Nos. 2,870,101 and 2,870,099 to facilitate formation of such polymers, but these do not compare with the catalyst of this invention.

The present invention relates to a process of the type disclosed in copending application Ser. No. 47,958, filed Aug. 8, 1960, for polymerization of cyclic oxides and more particularly to an improved ionic catalyst for such polymerization. It has now been discovered that the formation of rubbery polymers of propylene oxide and other cyclic oxides is facilitated by certain organic metal complexes, such as zinc-aluminum and copper-aluminum complexes. Such complexes, for some reason, are unusually effective catalysts for such polymerization making it possible to reduce the reaction time and/or temperature and the amount of catalyst and to provide tough rubbery polymers of high molecular weight (i.e., 200,000 to 2,000,000) having the physical properties desired in many commercial rubber products. The novel method of this invention involves the formation of metal complexes by reacting an organic aluminum oxide, such as an aluminum trialkoxide, with a divalent metal halide, such as zinc chloride or copper chloride.

The exact structural formula of the metal complex produced by such reaction is not known. The reaction of an aluminum trialkoxide with zinc chloride, for example, may form a zinc-aluminum ortho ester, which, for some reason, has an exceptional ability to initiate ionic polymerization of olefin oxides.

Metal halides other than halides of zinc, copper, and cadmium, such as lead chloride and calcium chloride do not provide products having suitable catalytic properties. The most effective catalysts are prepared by reacting an aluminum trialkoxide with a halide of zinc or copper, best results being obtained when using zinc chloride. The novel catalysts of this invention may be employed in various polymerization systems and are particularly useful as ionic catalysts in the bulk and solvent polymerizations (homopolymerizations or copolymerizations) of epoxides such as propylene oxide, butadiene monoxide or the like.

An object of this invention is to provide a catalyst for the polymerization of organic epoxides such as propylene oxide.

Another object of the invention is to provide a method for producing a material characterized by its utility in catalyzing the polymerization of epoxides.

A further object is to provide an improved method for polymerizing epoxides which produces rubbery products of very high molecular weight in a short period of time.

These and other objects and advantages of the present invention will become apparent to those skilled in the art from the following description and claims.

According to the present invention it has been discovered that the reaction product of at least one compound A having the formula Al(OR)$_3$, where each R is a hydrocarbon radical free of aliphatic unsaturation and containing from 1 to 20 carbon atoms, and at least one metal halide B having the formula MX$_2$, in which M is a cadmium, copper, or zinc atom and each X is a halogen atom (i.e., a fluorine, chlorine, bromine or iodine atom), will act as a catalyst to polymerize epoxides to afford high yields of polymers having high viscosities. The reaction product of A and B is relatively stable and can be stored before use under non-oxidizing or inert conditions at about room temperature for extended periods of time without deterioration. Where mixtures of the aluminum organic oxide and mixtures of the halides have been used to form the reaction product, organic radicals R, the metal atoms M, and the halogen atoms X can be different in the components of the mixtures.

Examples of useful organic aluminum oxides operative in the preparation of the catalysts of this invention are aluminum trimethoxide Al(OCH$_3$)$_3$, aluminum triethoxide, aluminum triisopropoxide, aluminum diisopropoxide methoxide

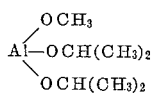

aluminum triphenoxide, aluminum triisobutoxide, aluminum tricyclohexoxide, aluminum trihexoxide, aluminum tritoloxide, aluminum triheptoxide, aluminum trioctoxide, aluminum tri(methylcyclobutoxide), aluminum trioctadecoxide, aluminum trinaphthoxide, diethyleicosyl aluminate, aluminum tridodecoxide, aluminum tridecoxide, aluminum tri(phenylcyclobutoxide), aluminum tri(bicyclodecoxide), aluminum tri(methyltolylene cyclohexoxide) and similar aluminum alkoxides, aryloxides or arylates, cycloaliphatic oxides, arylalkoxides, cycloaliphatic-alkoxides, cycloaliphatic-arylates, cycloaliphatic-aryl-alkoxides and mixtures thereof where the organic portion of the aluminum compound can be the same or different. Of these compounds it is preferred to use those having 3 to 40 carbon atoms, and best results are obtained using those having the formula Al(OR)$_3$ in which each R is an alkyl radical of from 1 to 10 carbon atoms such as, for example, the methyl, ethyl, propyl, isopropyl, butyl, isobutyl, amyl, isoamyl, hexyl, 2-ethylhexyl or decyl radical.

Examples of metal halides which can be employed in the preparation of the catalysts of this invention are CdCl$_2$, CdClI, CdBr$_2$, CdI$_2$, CdBrI, CuCl$_2$, CuBr$_2$, CuI$_2$, CuBrCl, CuClI, CuBrI, ZnF$_2$, ZnCl$_2$, ZnBr$_2$, ZnI$_2$, ZnFCl, ZnClBr, ZnBrI, ZnICl, and mixtures thereof. It is preferable to employ metal halides containing chlorine, bromine or iodine atoms and copper or zinc atoms, and best results are obtained with zinc halides.

The aluminum compound and the metal halide should be anhydrous or essentially anhydrous prior to reaction with each other. In other words, these materials should be free of occluded water or water of crystallization. These materials can be freed of water readily by drying at temperatures above room temperature, for example, at 100° C. and at atmospheric pressure or at pressures substantially below atmospheric pressure. More specifically, the aluminum compound can be dried by heating in benzene to azeotrope off any residual water or alcohols present. The metal halide can be dried by melting or fusing the metal halide to drive off all volatile materials.

The amounts of the aluminum organic oxide compound and metal halide to be reacted together can vary widely, since at the end of the reaction any unreacted aluminum compound or metal halide can be removed by the use of suitable means such as solvents. For example, excess amounts of the unreacted aluminum compound can be removed by treating the reaction product with aliphatic hydrocarbon solvents such as n-heptane, n-octane, isooctane or decane. It is best to use these materials in amounts such that they are entirely reacted or to use an excess of the aluminum compound to insure that all of the metal halide is reacted to avoid unnecessary subsequent treating steps to eliminate the unreacted material. Thus, the relative mol ratio of the aluminum compound(s) to the metal halide(s) can vary from about 10:1 to about 0.7:1 and is usually at least 1.5:1. Such mol ratio is preferably in the range of 3:1 to 1:1.

The aluminum organic oxide and the metal halide should be reacted together under a dry, inert or non-oxidizing atmosphere at an elevated temperature sufficient to effect their reaction (i.e., 100° to 200° C.). Examples of useful inert atmospheres are nitrogen, helium, neon, argon and krypton. A substantial amount of heat may be employed. However, temperatures which would cause decomposition, pyrolysis or vaporization of the aluminum organic oxide or loss of the metal halide should be avoided. In general, the temperature can vary from about 60° C. to 250° C. High temperatures tend to cause rapid reaction so that more care must be observed in the preparation. It is preferred to employ temperatures of from about 100° to about 200° C. Excellent results may, for example, be obtained using a temperature of about 160° to 180° C. when reacting a zinc halide with an aluminum trialkoxide.

At the end of the reaction the by-products produced, as well as any excess reactants, can be separated or stripped from the reaction product, for example, by filtration, by the use of solvents, or by evacuation. The use of solvents is particularly desirable where the by-products are not liquids of low viscosity. It is much preferred, however, to reduce the pressure in the reactor containing the aluminum organic oxide and metal halide to remove the by-products as they are produced and to avoid the formation of materials which would be difficult to separate from the reaction product.

While the aluminum compound and metal halide can be reacted in a solvent, such as ether, to form the metal complex of this invention, it is much preferred to react them in bulk or mass to avoid the use of hazardous solvents as well as to avoid the necessity of removing and recovering expensive solvents. The product obtained at the end of the reaction and after cooling is generally a solid which can be readily pulverized or powdered, if necessary, for subsequent use as a polymerization catalyst.

The by-products obtained during formation of the metal complex are generally gases or liquids which, as pointed out above, can easily be removed during the reaction. If desired, such by-products may be removed very readily by vacuum, for example, by applying to the reaction mass a vacuum of from about 1 to 50 mm. of mercury. Examples of by-products which are formed during the reaction and which are preferably drawn off during the reaction are organic halides, ethers and hydroxy compounds having the formulae R—X, R—O—R and R—OH, where R and X are as defined above, as well as some unsaturated hydrocarbons or olefins.

While the reaction product with all the impurities or by-products as well as any excess reactants can be used as such for the polymerization of the epoxides, it is much preferred to separate the extraneous materials from the reaction product to obtain the highest yields of high molecular weight amorphous polymers as well as more consistent results during epoxide polymerization. Where an excess over a molar equivalent of the aluminum compound, $Al(OR)_3$, is employed with the metal halide to form the metal complex of this invention, it is preferable to remove the unreacted aluminum compound by treating the reaction product with a solvent for the aluminum compound (i.e., n-heptane). Although it is preferable to use more of the aluminum compound, good catalysts may also be made by reacting a slight excess over a molar equivalent of the metal halide with the aluminum compound and separating the unreacted metal halide from the reaction product by dissolving the reaction product in a suitable solvent, such as benzene, dioxane, or the like.

The exact structural formula of the metal complex of this invention produced by the reaction of the aluminum compound and the metal halide as described above is not known, but it is believed that it contains 3 aluminum atoms for every 2 atoms of zinc or other metal.

When performing the preferred method of this invention, the aluminum compound and the metal halide are reacted at an elevated temperature (i.e., 100° to 200° C.) and a distillate is produced which comprises about one-fifth to two-fifths and preferably no more than one-third of the total weight of the charged reactants. The distillate is removed during the reaction and the excess unreacted aluminum compound is removed by washing one or more times with n-heptane or other suitable solvent which does not dissolve the metal complex (catalyst). After washing with n-heptane, the reaction product is dried and may then be treated with a solvent, such as dry benzene. A substantial portion, essentially the monomeric reaction product, usually in the amount of about 30 to 60% by weight, will dissolve in the benzene while the remainder is essentially insoluble in the benzene or forms a gel in the benzene.

If the soluble portion is removed from the insoluble portion, separated from the benzene, and analyzed, the analysis shows that the soluble portion is very similar in composition to the insoluble portion. This benzene soluble form is useful in the polymerization of epoxides dissolved in solvent media and also can be used in bulk (solvent-free) polymerizations. The insoluble (gel) fraction from the benzene mixture after treatment to remove occluded benzene is very active in the bulk polymerization of epoxides and should be used in that system rather than the solvent polymerization system, although it will act as a catalyst in both systems. The benzene insoluble fraction is believed to be composed of substantial amounts or entirely of the polymeric form of the reaction product (e.g., dimers, trimers, tetramers and so forth). It is undesirable to convert all of the reaction product to the insoluble polymeric form when reacting the metal halide with the aluminum organic oxide. At least ⅓ of the reaction product should be soluble in benzene and as much as ⅔ of the reaction product may be soluble in benzene.

While the preparation of the catalytic reaction product of this invention can be carried out in the same vessel in which the epoxide monomer is polymerized before such epoxide monomer is added, it is preferable to prepare it in a separate reactor to avoid tying up the polymerization reactor which is economically used only for polymerization. The reactants should be free of water and relatively pure. The reactor employed to prepare the catalytic reaction product or catalyst should be clean and free of any materials such as ketones, which might adversely affect the reactants or reaction product.

The unusual advantages of the present invention are obtained if the metal halide is reacted with the aluminum compound for a substantial period of time to form the metal-aluminum complex (catalyst) before such complex is added to the epoxy compounds to be polymerized. It is thus preferable to prepare the catalyst by forming a mixture comprising essentially the (fused) metal halide, $MX_2$, and the aluminum compound, $Al(OR)_3$, reacting these materials at a temperature of 100° to 200° C. for 1 to 12 hours to form a complex organic metal-aluminum reaction product and volatile non-metallic organic compounds, removing said volatile compounds, and then removing all but a small percentage (i.e., all but 0.5 to 5%) of any unreacted metal halide or unreacted aluminum compound which may remain with said complex reaction product to increase the purity of said product. If desired, the benzene-soluble portion of said product may be separated from the benzene-insoluble portion by use of benzene or other aromatic solvent.

The reaction of the (fused) metal halide and the aluminum compound is preferably terminated before ⅔ of said complex reaction product has reached the benzene-insoluble state (i.e., while about ⅓ to ⅔ of the complex reaction product is soluble in benzene). Such reaction is preferably controlled so that the weight of said volatile organic compounds is ⅕ to ⅓ of the sum of the weights of the charged reactants and is usually controlled so that the weight of said volatile organic compounds is ¼ to ½ the weight of said complex reaction product, although this may vary considerably depending on the mol ratios used. At least 0.7 mole of said aluminum compound should be employed per mol of said metal halide, and usually no more than 1.5 or 2 moles of said aluminum compound are actually mixed with 1 mol of the metal halide.

If the metal halide is cupric chloride, rather than the chloride of a metal in Group IIB of the Periodic Table (i.e., zinc or cadmium), the ideal temperature for the reaction will be somewhat different. However, temperatures between 100° and 200° C. are satisfactory for halides of zinc, copper or cadmium when reacting said halides with aluminum triisopropoxide and other aluminum organic compounds.

The catalyst of this invention can be dissolved in various solvents and may be used in solvent or bulk polymerizations. The catalyst can, for example, be dissolved in aromatic solvents (such as benzene or toluene), in cyclic ethers (such as dioxane), and in diethyl carbitol.

POLYMERIZATION

Since the catalyst of the present invention is very effective in initiating the homopolymerization or copolymerization of various conventional epoxy compounds through the oxirane groups, those skilled in the art will have no difficulty in using such catalyst in many well known polymerization processes or in making the slight changes in proportions necessary to obtain high molecular weight polymers from the known processes (i.e., either solvent or mass polymerization processes). The catalyst of this invention can be used not only with 1,2-epoxy alkanes, such as propylene oxide, but also with many other epoxides including epihalohydrins and various mono- and di-glycidyl ethers. The present invention is particularly important because it provides an economical method of producing predominantly atactic rubbery polymers of very high molecular weight. The predominantly crystalline polymers prepared by previously known catalysts are not useful for preparing rubber products.

The epoxides to be polymerized include any epoxide having up to a total of 50 carbon atoms and having 1, 2, 3, 4 or more oxygen-carbon rings in which an oxygen atom is joined to 2 carbon atoms in the ring which will open and polymerize with the same or other epoxide monomers. These monomers can contain 1, 2 or more (preferably only 1) aliphatic carbon-to-carbon double bond. The alkenyl-, halogen-, nitro-, ether- and ester-substituted derivatives of these epoxides likewise can be employed.

The use of monomer mixtures having epoxide monomers containing alihphatic carbon-to-carbon double bond unsaturation in an amount of from about 0.5 to 20 mol percent, the balance being the saturated epoxide monomer, permits the resulting copolymer to be cured readily with materials such as sulfur and the like. A very useful mixture is one containing propylene oxide in an amount of from about 90 to 99.5 mol percent and allyl glycidyl ether, vinyl cyclohexene monoxide, or butadiene monoxide, in an amount of from 10 to 0.5 mol percent to obtain a sulfur-vulcanizable copolymer. Minor amounts of from about 0.5 to 20 mol percent of a third, fourth or fifth monomer of from 4 to 12 carbon atoms such as, for example, 1,2-butene oxide or 2,3-hexene oxide, can be present to break up or substantially eliminate the crystallinity of the copolymer where desired, especially where only small amounts of an unsaturated monomer are needed and more flexibility in processing and molding are desired.

The catalyst of this invention is the only one known which effectively initiates copolymerization of propylene oxide with a halogen-substituted olefin oxide such as an epihalohydrin. This catalyst also initiates copolymerization of major amounts of propylene oxide and other 1,2-epoxy alkanes with minor amounts (i.e., 5 to 10 mol percent) of butylene oxide, tetramethylene oxide or other suitable comonomer so as to facilitate the manufacture of rubbery atactic copolymers having the active methylene groups desirable for curing with conventional peroxide cross-linking agents such as dicumyl peroxide or the like.

The sulfur-curable and peroxide-curable copolymers of this invention are preferred for making elastic rubber products having high tensile strengths (i.e., tensile strengths of 2000 p.s.i. or higher), but other rubbery polymers made by the method of this invention are also useful commercially.

Examples of epoxides which may be polymerized using the novel catalyst of this invention are ethylene oxide, propylene oxide, 1,2-butene oxide (or 1,2-epoxy butane), 2,3-butene oxide, 1,2-dodecene oxide, isobutylene oxide, 1,2-pentene oxide, isopentene oxide, styrene oxide, 1,2-diisobutylene oxide, 1,2-hexene oxide, 2,3-hexene oxide, 1,2-heptene oxide, 2,3-diisobutylene oxide, allyl glycidyl ether, isoheptene oxide, octene oxide, nonene oxide, decene oxide, henedecene oxide, 1,2-epoxy pentacosane, methyl glycidyl ether, ethyl glycidyl ether, heptacontene oxide, epichlorohydrin, vinyl cyclohexene monoxide, nitro ethylene oxide, phenyl glycidyl ether, butadiene dioxide, 3-methyl-3,4-epoxy butene-1, butadiene monoxide, vinyl cyclohexene dioxide, glycidyl methacrylate, 2,3-diisobutylene oxide, di-cyclopentadiene monoxide, limonene dioxide, isoprene monoxide, the diglycidyl ether of pentanediol, (3,4 - epoxy - 6 - methyl cyclohexyl methyl)-3,4-epoxy-6-methyl cyclohexane carboxylate, the reaction product of the diglycidyl ether of pentanediol and bisphenol A, 1-epoxyethyl-3,4-epoxy cyclohexane, 1,4-dichloro-2,3-epoxy butane, allyl epoxy stearate, the reaction product of the diglycidyl ether of pentane-diol and a polyalkylene and/or arylene ether glycol, and the like. Preferably, these epoxides have a total of from 2 to 25 carbon atoms. Of these materials it is more preferred to use major amounts of the lower molecular weight monoepoxides containing an oxirane group and from 2 to 12 carbon atoms (such as, for example, ethylene oxide, propylene oxide and butylene oxide) with minor amounts (preferably 5 to 20 mol percent) of unsaturated monoepoxides containing from 3 to 12 carbon atoms (such as, for example, allyl glycidyl ether, butadiene monoxide and vinyl cyclohexene monoxide). Mixtures of these epoxides can also be used. The catalyst is useful, for example, in the manufacture of a terpolymer of propylene oxide, allyl glycidyl ether and phenyl glycidyl ether.

Where the epoxide monomer contains 2 or more vicinal epoxide groups, it may readily crosslink or gel in the presence of the catalyst of this invention to form a resinous material. Such resins are very useful in forming potting compounds for delicate electrical and mechanical instruments. Conventional methods may be used to effect curing. These compounds which have no ethylenic unsaturation may be cured in the usual manner with organic peroxides such as dicumyl peroxide. The polymers which have unsaturated groups may be cured more easily with sulfur or various other curing agents such as tetraethyl thiuram disulfide or other organic sulfur curing agents.

The catalyst reaction product is preferably used in a minor amount by weight only sufficient to catalyze the polymerization reaction. Large amounts are usually wasteful and tend to produce low molecular weight polymers. The molecular weight of the polyperoxide polymers is apparently dependent on the catalyst concentration. In general, there is used from about 0.01 to 10 percent by weight of the catalyst reaction product based on the weight of the monomer. The lower catalyst concentrations give higher molecular weight polymers.

The monomers can be polymerized with the catalyst in mass or bulk or in solvent, preferably with agitation of the reactants. More catalyst is usually employed in the solvent than in the bulk system to achieve the same ultimate polymer. To avoid the loss of volatile monomers and to avoid oxidation, the polymerization should be conducted in a closed container under pressure. The monomers preferably should be polymerized under dry, inert and/or non-oxidizing conditions (for example, under an atmosphere of nitrogen, argon, neon, helium, krypton or other inert or non-oxidizing atmosphere). It is sometimes desirable to polymerize in a dry solvent since this facilitates handling and operation. Alternatively, the inert gas can be omitted and the monomer polymerized in the solvent only under autogenous pressure from vaporized solvent or gaseous monomer. The monomer should be soluble in the solvent which should be an inert or non-reactive dry solvent. Examples of useful solvents are heptane, octane, cyclohexane, toluene, benzene, trimethylpentane, carbon tetrachloride, chloroform, diethyl ether and trichloroethylene. It is preferred to use non-polar hydrocarbon solvents. Polymerization can be conducted at temperatures of about 25° C. or even somewhat lower, but is preferably conducted at elevated temperatures (i.e., 100° C.).

In general, the catalyst (at room temperature or at a temperature lower than that at which it was prepared) is placed in the reactor, the monomer or monomer and solvent is added at room temperature, and heat is applied as necessary to effect polymerization. Alternatively, the catalyst can be added with the solvent to the monomer or epoxide. If the polymer dissolves in the solvent, it can be precipitated with a non-solvent and recovered or the solvent can be separated from the polymer by steam stripping. The catalyst reaction product or catalyst residues can be removed if desired by centrifuging a solution of the polymer. If it is desired to destroy or kill the catalyst, the polymer may be treated with water, alcohol solutions or dilute solutions of acids and the like. Alkaline materials may be used to neutralize the catalyst.

Since the polymerization reaction is exothermic and since some monomers may react very rapidly, it may be desirable to reduce the concentration of the catalyst reaction product or to use a solvent or diluent as discussed above. Alternatively, the amounts of the catalyst reaction product can be increased to speed up the amount and rate of conversion or polymerization. Polymerization preferably takes place solely through oxirane groups of the monomers.

The polymers and copolymers obtained by the method of the present invention usually have a high average molecular weight (i.e., from about 100,000 to 500,000 or higher) as shown by their high viscosities. They are predominantly amorphous or atactic. Such resinous and rubbery polymers and copolymers are useful as coatings for fabrics, films for packaging materials, elastic fibers or threads, adhesives, and in making tires, shoe heels, raincoats, printing rollers, garden hose, electric wire jackets, upholstery materials, floor mats, tiles, sponges, rubber shoes, golf balls, molded articles and encapsulating compounds.

The polymers may be compounded with the usual rubber and resinous compounding materials, such as curing agents, anti-degradants, fillers, extenders, reinforcing agents, ultraviolet light absorbers, fire resistant materials, dyes, pigments, plasticizers, lubricants, other rubbers and resins. Examples of useful materials which can be compounded with these rubbers, resins and polymers are zinc oxide, stearic acid, sulfur, 2-mercaptobenzothiazole, bis-(morpholyl) disulfide, bis(benzothiazyl) disulfide, bis-(morpholyl) tetrasulfide, zinc dimethyl dithiocarbamate, tetramethyl thiuram disulfide, carbon black, $TiO_2$, iron oxide, calcium oxide, $SiO_2$ and $SiO_2$-containing materials, silicon monoxide, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta-naphthylamine, pine oil, mineral oil, hydroquinone monobenzyl ether, mixtures of octylated diphenylamines, styrenated phenols, aldol alpha-naphthylamine, diphenyl amine-acetone reaction products, antimony oxide, asphalt, coumarone indene resin, natural rubber, polyisoprene, cis-polybutadiene, polyacrylate rubbers, butadiene-styrene rubber or resin, nitrile rubber, acrylonitrile-styrene resin, polyester and/or ether urethanes, polyvinyl chloride, vinyl chloride-vinylidene chloride copolymers and mixtures thereof.

The catalyst of the present invention is particularly well suited for the polymerization of vicinal-epoxy hydrocarbons such as propylene oxide, epoxy butanes and other epoxy hydrocarbons disclosed, for example, in U.S. Patent No. 3,030,315. The catalyst may be employed to polymerize an alkylene oxide such as propylene oxide and a halogen-substituted alkylene oxide such as epichlorohydrin. It can be used to polymerize a single vicinal-epoxy hydrocarbon (one having the oxygen atom contained in an oxirane group) or an admixture of at least two different vicinal epoxy hydrocarbons. In polymerizing a mixture, it is usually preferred that one of the vicinal epoxy compounds be a lower olefin oxide such as ethylene oxide, propylene oxide, 1,2-epoxybutane, or 2,3-epoxybutane.

The catalyst of this invention is employed in catalytically significant quantities with the epoxy monomer to initiate the polymerization. For optimum results, the particular catalyst, its surface area, the nature of the monomeric reagent or reagents, the temperature at which the polymerization is conducted and other factors will determine the optimum catalyst concentration.

The temperature employed to effect the bulk or solution polymerization reaction can vary over a wide range. In general, a reaction temperature in the range of from about 25° C. or lower to about 150° C. is suitable. A reaction temperature in the range of from about 50° C. to about 120° C. is preferred. In practice, the temperature employed to effect the polymerization reaction depends to an extent on the nature of the epoxy reagents, the particular catalyst employed, the concentration of the catalyst, and other factors. High pressure apparatus permits use of higher polymerization temperatures but it is impractical to employ temperatures in excess of 200° C. even in solution polymerizations.

The time required for the polymerization reaction will, in general, vary depending upon the temperature, the nature of the epoxy reagents employed, the particular catalyst, the catalyst concentration, the type and amount of an inert liquid organic vehicle and other factors. The reaction time can be a few hours or may be several days.

The polymerization reaction usually takes place in the liquid phase and is preferably conducted under an inert atmosphere (i.e., nitrogen). The polymerization is preferably effected under substantially anhydrous conditions for a period of time sufficient to produce a rubbery polymer.

The polymerization reaction may be carried out in the presence of an inert solvent (i.e., an aromatic hydrocarbon, such as benzene, toluene, xylene etc., a chlorinated hydrocarbon such as carbon tetrachloride, ethylene dichloride or an aliphatic hydrocarbon such as pentane, isooctane, etc., and may also be carried out without a solvent. It is preferable not to use a solvent where the alkylene oxide is a liquid at normal temperatures. Ordinarily the reaction is conducted under pressures ranging from atmosphere to about 50 atmospheres.

It is customary to compare rubbery materials of high molecular weight, such as propylene oxide polymers, by measuring the intrinsic viscosity [η] in deciliters per gram. As pointed out in French Patent No. 1,248,137 and French Patent No. 1,264,491, it is difficult to produce tough propylene oxide rubbers having an intrinsic viscosity of 4 or more. The catalyst of the present invention is very effective and facilitates manufacture of such rubbers. The reaction product of zinc chloride and an aluminum trialkoxide, for example, provides results comparable to those obtained with the best known catalysts (i.e., zinc diethyl) and permits the formation of propylene oxide polymers having a very high intrinsic viscosity (i.e., 3 to 5 deciliters per gram measured in isopropanol at 60° C.).

The method of this invention is particularly well suited for stereospecific polymerization and can produce a high yield of a rubbery atactic polymer having a high molecular weight. It is possible to produce tough rubbery polymers less than one-third of which are in the crystalline form and at least two-thirds of which are in the preferred atactic form. The atactic fraction of the polymerization product can be separated from the crystalline fraction and can be tested for molecular weight. Such atactic fractions may have a molecular weight of 200,000 to 1,000,000 or more and may have an intrinsic viscosity [η] of 2 to 5 deciliters per gram or more measured in isopropanol at 6° C. This invention provides a method of making predominantly atactic rubbery polymers of propylene oxide and other vic-epoxy alkanes such as copolymers of propylene oxide and butylene oxide and copolymers of propylene oxide and allyl glycidyl ether, which is practical for commercial manufacture since 80 to 95 mol percent of the rubbery polymers is atactic and only 5 to 10 or 20 percent of the polymers is crystalline. At least ¾ and preferably at least ⅘ of the rubbery polymers are soluble in acetone at −20° C. and have an intrinsic viscosity of at least 3 deciliters per gram measured in isopropanol at 60° C.

Acetone is a convenient solvent for separating the crystalline (isotactic) fraction from the amorphous (atactic) fraction of a rubbery alkylene oxide polymer, such as a copolymer of propylene oxide and butadiene monoxide. When the solution of polymer and acetone is cooled to a low temperature in the neighborhood of −20° C. or below, the crystalline portion can be separated out since it is insoluble in acetone at such a low temperature. It is, therefore, relatively easy to determine the percentage of the rubbery polymer which is atactic.

The catalyst of this invention is very effective and may be used to effect copolymerization of at least one epihalohydrin, such as epichlorohydrin and at least one monoepoxide, such as propylene oxide. Such copolymerization can, for example, produce predominantly atactic rubbery copolymers of 80 to 95 mol percent of propylene oxide and 20 to 5 mol percent of epichlorohydrin having a molecular weight of 50,000 to 500,000 or more. It is usually preferred to polymerize 90 to 98 mole percent of propylene oxide or other alkylene oxide with 10 to 2 mol percent of epichlorohydrin so as to provide a predominantly-atactic polymer containing only a small percentage of chlorine.

The high molecular weight rubber copolymers produced by copolymerizing propylene oxide with minor amounts (i.e., 2 to 20 mol percent) of comonomers such as allyl glycidyl ether or butadiene monoxide according to this invention can be cured with sulfur and other conventional curing agents. In order to form a vulcanizable rubber composition 100 parts by weight of the copolymer of this invention may, for example, be mixed with 30 to 80 parts of fine high abrasion furnace carbon black or other reinforcing filler, 0.5 to 2 parts of phenyl-beta-naphthylamine or other antioxidant, 2 to 8 parts of zinc oxide, 1 to 3 parts of stearic acid, 2 to 4 parts of sulfur and 0.5 to 4 parts of an accelerator such as tetramethyl thiuram disulfied. Various other compounding ingredients may also be employed. The conventional compounding procedures produce vulcanizable rubbers which when cured to the elastic state have a high tensile strength (i.e., at least 2000 p.s.i.) and are suitable for many elastic rubber products.

The present invention permits the use of conventional amine-type antioxidants when polymerizing an epoxy compound such as propylene oxide or the like and thereby provides better polymers. Such antioxidants, heretofore, were not used during polymerization since they seemed to interfere with the polymerization. The conventional amine-type antioxidants which may be incorporated with the vic-epoxy compound and the metal-aluminum catalyst includes diphenyl-p-phenylenediamine, phenyl-beta-naphthylamine, p-isopropyl diphenylamine, aldol-alpha-naphthylamine, octylated diphenylamines, dinaphthyl-p-phenylenediamine, di-beta-naphthyl-p-phenylenediamine, N,N'-diphenyl-p-phenylenediamine, N-isopropyl - N'-phenyl-p-phenylenediamine, N - phenyl-N'-cyclohexyl-p-phenylenediamine, 4-isopropylamino diphenylamine, alkylated diphenylamine, mixtures of the above, and the like The amounts of the phenyl-beta-naphthylamine or other amine-type antioxidant mixed with the monomers prior to or during polymerization may be substantially the same as are conventionally added when the polymerization is completed (i.e., at least 0.3 and usually 0.5 to 1.5 percent of the total weight of the monomers).

*Example 1*

To produce a reaction product of aluminum triisopropoxide and zinc chloride in a mol ratio of 2:1 the required mol quantity of zinc chloride (ACS grade) was fused in a flask by heating the flask under nitrogen until the zinc chloride was completely liquid. Moisture (approximately one percent by weight of the charged zinc chloride) and hydrogen chloride gas was evolved from the fused zinc chloride. (It is conceivable that a small quantity of zinc oxychloride (HOZnCl) was formed and could participate in the reaction with the aluminum triisopropoxide.) The dried zinc chloride was cooled to 100° C. and powdered, distilled aluminum triisopropoxide was added to the zinc chloride in a molar ratio of 2:1, and the mixture was heated gradually to 170° C. under nitrogen. At 130° to 140° C. the aluminum triiospropoxide melted and isopropyl chloride distilled off. Isopropanol distilled off at 160–170° C., and diisopropyl ether distilled off at 170° C. As these liquids distilled off, the reaction mixture became progressively more viscous and the fused zinc chloride disappeared.

On cooling the flask and contents to room temperature, the reaction product was powdered and poured directly from the flask into a nitrogen-flushed bottle. Unreacted aluminum triisopropoxide was removed by treating the product with n-heptane and drying the insoluble portion which was then treated with dry benzene to separate the benzene-soluble reaction product (A) from the benzene-insoluble reaction product (B).

The by-products or distillate and residues from the reaction were analyzed (boiling point, refractive index, Beilstein test, infrared spectra, odor and chromatographic curves) and found to consist mostly of isopropyl chloride, diisopropyl ether, isopropyl alcohol and some propylene.

*Example II*

In this example, reactions were conducted by heating pure dry aluminum triisopropoxide with zinc chloride, which had previously been fused to evaporate any water present and then cooled, the amounts of materials used and the reaction conditions being shown in Table I. All of the reactions were conducted in a one-liter 3-neck round bottom flask equipped with a heavy nichrome wire Hershberg-type agitator, Dean trap and a Dry Ice condenser. The materials were heated to various temperatures between 140° and 170° C. at atmospheric pressure or a pressure of 100 millimeters of mercury for various periods of time until a substantial percentage of the charged materials were removed as a distillate and propylene. The reaction products were white or light colored materials which were easily powdered. The materials were washed 3 to 5 times with n-heptane, dried, and then washed with benzene, and the benzene-soluble material was separated from the material insoluble in n-heptane and benzene by filtration and vacuum dried to form a white powder.

When forming the catalyst A, for example, the pure dry materials were weighed into the nitrogen-flushed liter flask and heated to 170° C. at atmospheric pressure. Propylene began coming off after only 2 milliliters of liquid had distilled off. After 27 grams of distillate were obtained, the mixture in the flask became extremely viscous and wrapped around the Hershberg stirrer, and then the mixture was cooled to room temperature and pulverized to a light colored powder. The powder was reheated to 170° C. until no more liquid distilled off. The powder was washed with dry n-heptane and benzene in the manner described above, and no solid material was found to be present in the heptane or the benzene. The insoluble material was vacuum dried at 50° C.

The other catalysts B to H were prepared in a similar manner according to Table I. These catalysts are crystalline powders, the benzene-soluble portion being a white powder and the benzene-insoluble portion being a cream colored powder.

copolymerization of 0.97 mole of propylene oxide (PO) with 0.03 mole of allyl glycidyl ether (AGE) according to the procedure summarized in runs 12 to 17 of Table II. These bulk polymerizations were carried out using substantially the same procedure. The required amount of phenyl-beta-naphthylamine (one percent of the weight of the propylene oxide) and the amount of zinc-aluminum catalyst D were carefully weighed and placed in quart bottles. After capping the bottle with a punched bottle cap and a rubber gasket covered by a Teflon gasket, the bottles were reflushed with nitrogen. The desired amounts of propylene oxide and allyl glycidyl ether were then added to the bottles by a syringe. The bottles were placed in metal safety cages and rotated in a water bath at 80° C. for 45 to 65 hours to effect copolymerization.

In run 13, for example, the solid polymer had an intrinsic viscosity [$\eta$] in excess of 4 deciliters per gram (measured in isopropanol at 60° C.). As indicated in Table II the polymerization time was 64 hours and the conversion of monomer to polymer was 55.3 percent. Only 3 percent of the product was in the crystalline form, about 97 percent being in the preferred atactic form.

After the copolymerizations (runs 12 to 17) were completed the solid polymer was obtained from each bottle by wetting the polymer with distilled water and breaking the bottle by a hot wire. The polymer was then dried in a vacuum oven at 45° to 50° C. A small (i.e., 10 grams) sample of each dried polymer was then dissolved in acetone and treated with a small amount of an acetone-hydrochloric acid solution (i.e., 2 parts by weight of concentrated hydrochloric acid per 100 parts by weight of acetone) sufficient to kill or destroy the catalyst (i.e., about 1 mol of HCl per mol of catalyst). The acetone solution was clouded by the fine white precipitate which was formed. The catalyst residue and impurities were then separated by centrifugation for 10 to 15 minutes. The clear catalyst-free solution was placed in a freezer at −20° C. for 1 or 2 days and the precipitated swelled crystalline polymer was separated from the solution of atactic polymer by centrifugation for 10 or 15 minutes. Both fractions of polymer were precipitated from the acetone by mixing with distilled water. The two fractions were then dried in a vacuum oven at 45° to 50° C. In each case the crystalline portion was only a small fraction by weight of the amorphous portion. In run 13, for example, only 5 percent by weight of the polymer was insoluble in acetone at −20° C.

Other polymers were also prepared using the catalysts

TABLE I

| Catalyst | Al(O-ipr)$_3$ | | ZnCl$_2$ | | Al/Zn | Reaction Temp. (° C.) | Pressure (mm. Hg) | Reaction Time (hrs.) | Distillate, gms. |
|---|---|---|---|---|---|---|---|---|---|
| | Gms. | Moles | Gms. | Moles | | | | | |
| A | 81.6 | 0.4 | 81.7 | 0.6 | .67 | 170 | [1] ATM | 10 | 27.5 |
| B | 81.6 | 0.4 | 54.5 | 0.4 | [2] 1 | 170 | ATM | 10 | 29 |
| C | 92 | 0.45 | 41 | 0.3 | 1.5 | 140–150 | 100 | 8 | 10.5 |
| D | 163.2 | 0.8 | 54.5 | 0.4 | 2 | 160–170 | ATM | 10 | 44 |
| E | 81.6 | 0.4 | 21.8 | 0.16 | 2.5 | 140–150 | 100 | 8 | 7.7 |
| F | 81.6 | 0.4 | 10.9 | 0.08 | 5 | 150 | 100 | 8 | 1.8 |
| G | 81.6 | 0.4 | 5.45 | 0.04 | 10 | 150 | 100 | 8 | 4.1 |
| H | 163.2 | 0.8 | 54.5 | 0.4 | 2.0 | 170 | ATM | 8 | 32.4 |

[1] ATM designates atmospheric pressure.
[2] Al/Zn designates the mol ratio of the organic aluminum compound and the zinc chloride.

*Example III*

The benzene-soluble and benzene-insoluble portions of the catalyst D of Table I were used to initiate the bulk copolymerization of 0.97 mole of propylene oxide (PO)

A to H of Example II as indicated in Table II. Such polymers had very high molecular weights and were predominantly atactic.

TABLE II

| Run | Monomer | Catalyst[1] Type | Catalyst[1] Wt. Percent | PZN[2] Temp. °C. | PZN Time, Hrs. | Conv., Percent | Intrinsic Visc.[3] | Crystallinity,[4] Percent | Polymer |
|---|---|---|---|---|---|---|---|---|---|
| 1 | PO | A | 1.25 | 80 | 68.5 | Low | | | Very sticky. |
| 2 | PO | B | 3.46 | R.T. | 120 | 27.6 | 1.17 | 15 | Dry, opaque, tough. |
| 3 | PO | B | 1.25 | 80 | 68.5 | 90 | .732 | 6 | Sticky, rubbery. |
| 4 | PO | C | 1.17 | 80 | 45 | 70.7 | 2.15 | 7 | Tough, rubbery. |
| 5 | PO | $D_s$[5] | 1.03 | 80 | 45 | 68.4 | 1.51 | 3 | Soft, sticky. |
| 6 | PO | $D_I$ | 1.03 | 80 | 45 | 85.3 | 1.17 | 2 | Do. |
| 7 | PO | $D_a$ | .17 | 80 | 64 | 81.7 | 1.97 | 2 | Slightly sticky, rubbery. |
| 8 | PO | $D_I$[6] | .17 | 80 | 88 | 93 | 1.48 | 4 | Do. |
| 9 | PO | $D_I$ | 3.46 | [2]R.T. | 120 | 37.6 | 1.80 | 15 | Dry, tough. |
| 10 | PO | $D_I$ | .085 | 80 | 66 | 88.1 | 3.35 | 5 | Tough, fiberous. |
| 11 | PO | $D_I$ | .043 | 80 | 66 | 76 | | | Tough, rubbery. |
| 12 | PO-AGE[7] | $D_a$ | .04 | 80 | 64 | 61 | 3.10 | 4 | Dry, tough, rubbery. |
| 13 | PO-AGE | $D_I$ | .04 | 80 | 64 | 55.3 | 4.38 | 5 | Do. |
| 14 | PO-AGE | $D_a$ | .04 | 80 | 45 | 71.3 | 3.13 | 3 | Do. |
| 15 | PO-AGE | $D_a$ | .122 | 80 | 45 | 33.2 | 3.82 | 10 | Do. |
| 16 | PO-AGE | $D_a$ | .122 | 80 | 65 | 52.4 | 3.85 | 11 | Do. |
| 17 | PO-AGE | $D_a$ | .122 | 80 | 45 | 30.5 | 3.58 | 11 | Do. |
| 18 | PO | $E_s$ | 1.17 | 80 | 45 | 97.6 | 1.40 | 3 | Sticky, soft. |
| 19 | PO | $F_s$ | 1.17 | 80 | 45 | 83.2 | 1.29 | 2 | Do. |
| 20 | PO | $G_s$ | 1.17 | 80 | 45 | 89.3 | 1.66 | 9 | Slightly sticky, rubbery. |
| 21 | PO | $H_I$ | 0.344 | 80 | 45 | 31 | 2.12 | 5 | Slightly sticky, tough. |

[1] Based on the weight of monomer.
[2] PZN designates polymerization and R.T. designates room temperature.
[3] Measured in isopropanol at 60° C.
[4] Measured by gradient density.
[5] Subscript s—Benzene-soluble fraction of catalyst.
[6] Subscript I—n-heptane- and benzene-insoluble fraction of catalyst.
[7] PO designates propylene oxide and AGE designates allyl glycidyl ether.

*Example IV*

Zinc chloride containing in the neighborhood of 5% water was placed in a flask and heated until it was completely liquid and no more moisture was noticeable. After the (fused) zinc chloride had cooled to nearly 100° C., 81.6 grams (0.4 mol) of distilled aluminum triisopropoxide were weighed into the flask. The mixture was heated to 170° C. with 54.5 grams (0.4 mol) of said zinc chloride. No agitation was applied until the aluminum triisopropoxide had completely melted. The reaction was carried out for several hours at 170° C. As the distillate came off, a solid formed. When the reaction appeared to be over, a vacuum (18 millimeters pressure) was applied. The catalytic product was a white solid at 170° C. The time of the reaction was 8 hours.

The above product was then employed as a catalyst to effect copolymerization of propylene oxide and epichlorohydrin. The procedure followed was generally the same as in Example III. About 95 mols of propylene oxide were mixed with 5 mols of epichlorohydrin and about 0.1 mol (0.84 percent by weight of the monomers) of the above product (catalyst). No heat of reaction took place between the catalyst and the monomers when they were mixed in the test tubes. These 10-inch thick walled test tubes were placed in metal safety guards and rotated in a water bath maintained at 80° C. for 72 hours until 40% of the monomers had been converted to a polymeric form. After 72 hours, the solid polymer was dissolved in 800 milliliters of acetone containing an amount by weight of phenyl-beta-naphthylamine equal to 1% by weight of the charged monomers. An acidic solution consisting of 0.2 milliliter of concentrated hydrochloric acid dissolved in 10 milliliters of distilled water was then added to the acetone solution and agitated for one hour to kill the catalyst. A fine flocculent precipitate formed which was separated by centrifugation at 2000 revolutions per minute for 30 minutes. A half-full centrifuged tube of the polymer in acetone was diluted in half by addition of acetone and placed in a freezer at −20° C. over night. The precipitated crystalline fraction was separated from the atactic fraction by centrifugation and precipitation of the separate polymers from the acetone by addition of distilled water. It was found that 89% was atactic and 11% was crystalline. The inherent viscosity of the polymer was found to be about 2.8 dl./gm. measured in isopropanol at 60° C., and such polymer contained about 3.3% chlorine.

This example illustrates the fact that the zinc-aluminum catalyst of this invention is effective for copolymerization of propylene oxide and epichlorohydrin.

*Example V*

Portions of the catalyst prepared in Example I above were used to bulk polymerize propylene oxide (PO) monomers and comonomers in closed containers under nitrogen at 80° C. After the catalyst was added under $N_2$ to the container, the monomer was added under $N_2$ and the container was closed. Control experiments were conducted in which equal mols of a mixture (unreacted) of $ZnCl_2$ and aluminum triisopropoxide were used as a catalyst. The polymerization conditions and results obtained are shown below in Table III:

TABLE III

| Conditions | Run 22 | Run 23 | Run 24 | Run 25 | Run 26 | Run 27 | Run 28 |
|---|---|---|---|---|---|---|---|
| Mole percent monomers | [1]95PO/5AGE | [2]95PO/5ECH | [3]95PO/5BDMO | 100PO | 97PO/3AGE | 97PO/3AGE | 100PO |
| Mol catalyst per mol of monomers | [4]0.001 | [4]0.001 | [4]0.001 | [4]0.001 | [4]0.001 | [5]0.001 | [5]0.0034 |
| Wt. percent catalyst based on monomers | 0.84 | 0.84 | 0.84 | 0.84 | 0.84 | 0.84 | 2 |
| Time, hours | 45 | 168 | 45 | 45 | 45 | 45 | 24 |
| Percent Conversion | 91.5 | 64 | 94 | 92 | 91.5 | 83 | 90 |
| Percent Atactic | 89.2 | | 78.4 | 76 | | | 84 |
| Percent Crystalline | 10.8 | | 21.6 | 24 | | | 14 |
| ($\eta$)[6] of: | | | | | | | |
| Atactic, Amorphous | 2.19 | | 2.32 | 2.29 | | | 0.2–0.4 |
| Crystalline | 2.96 | | 3.46 | 4.31 | | | 3.7 |
| Copolymer or polymer: Atactic plus Crystalline | [7]2.20 | 2.81 | 2.60 | 2.67 | 2.32 | [8]1.49 | |

[1] Allyl glycidyl ether.
[2] Epichlorohydrin.
[3] Butadiene monoxide.
[4] Catalyst of present invention, Example I above.
[5] Untreated equimolar mixture of $ZnCl_2$ and $Al(OCH(CH_3)_2)_3$.
[6] Intrinsic viscosity (dl./g.) measured in benzene at 25° C.
[7] Carbon-black-reinforced sulfur-cured copolymer gave a snappy rubber.
[8] Polymer was very sticky, no strength.
PO—Propylene Oxide.

The above results show the great improvement in intrinsic viscosity obtained when the fused and stripped reaction product of the present invention is employed as a catalyst for propylene oxide and propylene oxide with comonomers as compared to an unreacted mixture of the zinc chloride and aluminum triisopropoxide. Moreover, with rsepect to propylene oxide alone it is noted that the mixture produced a polymer which was 84% atactic or amorphous, that portion having a viscosity of only 0.2 to 0.4, and which was a very low molecular weight material not at all like the atactic polypropylene oxide obtained with the catalyst of the present invention as shown by Run 25 above.

It is to be noted that the above polymerizations were conducted for extended periods of time. Under the same polymerization conditions using 0.2 mol percent of the catalyst of the present invention on the mols of propylene oxide employed, a 20% conversion of monomer to rubbery polypropylene oxide was obtained in 5 hours whereas with the same mol percent of the unreacted mixture (equal mols of $ZnCl_2$ and $Al(—O—iPr)_3$) no polymerization was observed after 5 hours and only about 20% conversion was achieved after about 20 hours. The unreacted mixture would not catalyze the copolymerization of propylene oxide and epichlorohydrin to form a rubbery polymer. Furthermore, 0.4 mol percent of the catalyst of Example I polymerized phenyl glycidyl ether to a hard solid polymer in 16 hours whereas said unreacted mixture required 120 hours to obtain the same results.

On the other hand, when anhydrous zinc chloride was used alone as a catalyst for the polymerization of propylene oxide, it produced a viscous liquid having an intrinsic viscosity of about 0.2 deciliter per gram. Aluminum triisopropoxide alone as a catalyst for propylene oxide provided a heavy grease having an intrinsic viscosity of 0.9 to 1.0 deciliter per gram.

*Example VI*

In order to prepare a copper-aluminum complex catalyst according to the present invention, 53.8 grams (0.4 gram moles) of anhydrous cupric chloride and 163.2 grams (0.8 gram moles) of aluminum triisopropoxide are weighed into a 3-neck one-liter round bottom flask and heated under nitrogen to 170° C., the pressure being maintained at atmospheric pressure. A distillate is produced which comes off more rapidly than with the catalysts of Example I. The mixture in the flask is a tan color at the start of the reaction, but on removal of distillate the color changes to a light green color which gradually becomes a gray color at the end of the reaction. The weight of the material removed from the flask is about 50 grams and the weight of the reaction product obtained is about 168 grams.

After the cupric chloride had reacted with the aluminum isopropoxide for 8 hours at atmospheric pressure and 170° C., the total amount of distillate which had been removed was about 40 grams. The viscous mixture was then mixed with dry n-heptane and centrifuged in a capped centrifuge bottle. A deep red heptane solution over a gray precipitate is obtained. Part of the heptane solution is then subjected to vacuum and heat to remove the heptane whereby there is obtained a very viscous resinous deep red clear material. This red resin is found to be an effective catalyst in the polymerization of propylene oxide and in the copolymerization of major amounts of propylene oxide with minor amounts of allyl glycidyl ether, but the catalyst is not as effective as the zinc-aluminum catalyst of Example I.

While cupric halides may be substituted for zinc chloride in preparing a catalyst according to this invention, other halides such as calcium chloride and lead chloride are not satisfactory and cannot produce effective catalysts for polymerization of propylene oxide or other epoxy compounds.

Unless the context shows otherwise, the term "polymer" is used herein in the generic sense to cover homopolymers, tripolymers and other copolymers; the term "copolymer" is used in the broad sense to include terpolymers, and the term "parts" means parts by weight. All percentages and proportions are by weight rather than by volume unless the context shows otherwise.

It will be understood that the above description is by way of illustration rather than limitation and that, in accordance with the provisions of the patent statutes, variations and modifications of the specific methods and products disclosed herein may be made without departing from the spirit of the invention.

Having described our invention, we claim:

1. A process comprising polymerizing under inert conditions (I) at least one polymerizable organic epoxide material having at least one ring of 2 carbon atoms and 1 oxygen atom in the presence of (II) a catalytically significant amount of a polymerization catalyst, characterized in that said catalyst comprises a solid reaction product obtained by heating a mixture of A and B under an inert atmosphere at a temperature of about 100° to about 200° C. to react A and B while withdrawing volatile nonmetallic products from the same and cooling the resulting reaction mixture, the relative mol ratio of A and B being about 0.7:1 to about 10:1, A being at least one essentially anhydrous aluminum compound having the formula $Al(OR)_3$, in which each R is a hydrocarbon radical of from 1 to 20 carbon atoms and is free of aliphatic unsaturation, B being at least one essentially anhydrous metal halide selected from the group consisting of $CdX_2$ and $ZnX_2$ in which each X is a halogen atom.

2. A method as defined in claim 1 wherein the mol ratio of said aluminum compound to said metal halide is about 0.7:1 to about 1.5:1 and the metal-aluminum complex formed during the reaction is treated with an aliphatic hydrocarbon solvent to remove any unreacted aluminum compound from said complex.

3. A process comprising polymerizing under non-oxidizing conditions (I) at least one polymerizable organic epoxide material having at least one oxirane group with (II) a minor amount by weight sufficient to polymerize said epoxide of a solid catalytic composition, characterized in that said catalytic composition comprises the reaction product under an inert atmosphere at a temperature of from about 60 to 250° C. of A and B, A being at least one essentially anhydrous aluminum organic compound having the formula $Al(OR)_3$ in which each R is a hydrocarbon radical of from 1 to 20 carbon atoms and is free of aliphatic unsaturation, and B being at least one essentially anhydrous metal halide selected from the group consisting of $CdX_2$ and $ZnX_2$ in which each X is a halogen atom, the mol ratio of A to B being from about 10:1 to about 0.7:1.

4. A process for the preparation of a polyether which comprises contacting at least one olefin oxide having a ring of two carbon atoms and one oxygen atom with a catalytically significant quantity of a solid metal-aluminum compound at a temperature in the range of about 30° to 200° C. and for a period of time sufficient to produce a rubbery polymer, said metal-aluminum compound being produced prior to its use by heating under an inert atmosphere at a temperature of from about 60 to 250° C. a mixture of an essentially anhydrous aluminum compound of the formula $Al(OR)_3$ and an essentially anhydrous metal halide of the formula $MX_2$ to form a metal-aluminum complex, each R being a hydrocarbon radical of 1 to 20 carbon atoms and free of aliphatic unsaturation, each X being a halogen atom, and M being a metal selected from the group consisting of cadmium and zinc, the mol ratio of said aluminum compound to said metal halide being from about 10:1 to about 0.7:1, and treating said metal-aluminum compound with a solvent to separate said metal-aluminum compound from any unreacted $Al(OR)_3$ and $MX_2$.

5. A process for the preparation of a polyether which comprises contacting at least one polymerizable organic epoxide having an oxirane ring with a catalytically significant quantity of a solid aluminum catalyst for a period of time sufficient to produce a polyether, said catalyst being formed prior to its use by heating at a temperature of from about 60 to 250° C. under an inert atmosphere an anhydrous mixture of an aluminum compound of the formula Al(OR)$_3$ and a metal halide of the formula MX$_2$ to form a metal-aluminum complex, said halide being essentially free of volatile impurities, each R being a hydrocarbon radical of 1 to 20 carbon atoms, and free of aliphatic unsaturation, each X being a halogen atom, and M being a metal selected from the group consisting of cadmium and zinc, the mol ratio of said aluminum compound to said metal halide being from about 10:1 to about 0.7:1, and removing any by-products from said catalyst.

6. A process for the preparation of a polyether which comprises contacting at least one polymerizable organic epoxide having an oxirane ring with a catalytically significant quantity of a solid aluminum catalyst at a temperature of from about 30° C. to about 200° C. and for a period of time sufficient to produce a polyether, said catalyst being formed prior to its use by heating under an inert atmosphere at a temperature of from about 60 to about 250° C. a mixture of an essentially anhydrous aluminum compound of the formula Al(OR)$_3$ and an essentially anhydrous relatively pure metal halide of the formula MX$_2$ to form said catalyst, each R being a hydrocarbon radical of 1 to 20 carbon atoms and free of aliphatic unsaturation, each X being a halogen atom, and M being a metal selected from the group consisting of cadmium and zinc, the mol ratio of Al(OR)$_3$ to MX$_2$ being from about 10:1 to about 0.7:1, distilling off by-products from the reaction of said Al(OR)$_3$ and said MX$_2$ during the heating of said mixture forming said catalyst, and treating said catalyst with a solvent to separate said catalyst from any unreacted Al(OR)$_3$ and MX$_2$.

References Cited by the Examiner

UNITED STATES PATENTS

| | | | |
|---|---|---|---|
| 2,706,181 | 4/1955 | Pruitt et al. | 260—2 |
| 2,870,100 | 1/1959 | Stewart et al. | 260—2 |
| 3,030,315 | 4/1962 | Bailey | 260—2 |
| 3,032,511 | 5/1962 | Langer et al. | 252—429 |
| 3,060,132 | 10/1962 | Weeks et al. | 252—429 |
| 3,135,705 | 6/1964 | Vandenberg | 260—2 |

OTHER REFERENCES

Journal of Polymer Science, vol. 34 (1959), Osgan and Price (pp. 153–156 relied on).

WILLIAM H. SHORT, *Primary Examiner.*

J. LIBERMAN, *Examiner.*

T. E. PERTILLA, R. A. BURROUGHS,
*Assistant Examiners.*